(12) United States Patent
Quinn et al.

(10) Patent No.: US 11,261,983 B2
(45) Date of Patent: Mar. 1, 2022

(54) SAFETY VALVE

(71) Applicant: QINOV8 UK LTD, Durham (GB)

(72) Inventors: Michael Quinn, Durham (GB); Mark Quinn, Durham (GB)

(73) Assignee: QINOV8 UK LTD, Durham (GB)

( * ) Notice: Subject to any disclaimer, the term of this patent is extended or adjusted under 35 U.S.C. 154(b) by 137 days.

(21) Appl. No.: 16/632,432

(22) PCT Filed: Jul. 20, 2018

(86) PCT No.: PCT/GB2018/052056
§ 371 (c)(1),
(2) Date: Jan. 20, 2020

(87) PCT Pub. No.: WO2019/016564
PCT Pub. Date: Jan. 24, 2019

(65) Prior Publication Data
US 2020/0208750 A1    Jul. 2, 2020

(30) Foreign Application Priority Data

Jul. 20, 2017 (GB) ........................................ 1711670
Jan. 10, 2018 (GB) ........................................ 1800401

(51) Int. Cl.
*F16K 17/30* (2006.01)
*F16K 17/28* (2006.01)
(Continued)

(52) U.S. Cl.
CPC ............ *F16K 17/30* (2013.01); *F16K 15/044* (2013.01); *F16K 15/1823* (2021.08);
(Continued)

(58) Field of Classification Search
CPC ...... F16K 17/30; F16K 17/285; F16K 17/403; F16K 15/1823; F16K 15/044;
(Continued)

(56) References Cited

U.S. PATENT DOCUMENTS

| 701,754 A | * | 6/1902 | Moran | ................ | F16K 17/0433 |
| | | | | | 137/509 |
| 2,121,936 A | * | 6/1938 | Thomas | .................. | F16K 17/26 |
| | | | | | 137/498 |

(Continued)

*Primary Examiner* — Craig M Schneider
*Assistant Examiner* — Frederick D Soski
(74) *Attorney, Agent, or Firm* — Culhane Meadows PLLC; Robert C. Klinger

(57) ABSTRACT

A self-sealing safety valve (10) for a container of pressurised fluid (12) comprises a substantially solid body (14) and attachment means (24) for connecting to a dispensing valve. The self-sealing safety valve includes a substantially central bore (16) extending through both the attachment means and the solid body, and the bore connects an inlet (20) to an outlet (18). The bore comprises at least three parts each of a different diameter: a first part (16a) immediately adjacent the outlet has a first diameter; a second part (16b) located immediately adjacent the first part has a second diameter that is wider diameter than the first diameter; and a third (16c) part located immediately adjacent the second part has a third diameter that is wider than the second diameter. The second part of the bore houses a first biasing means (30). The third part of the bore houses a sealing ball (28) and a second biasing means (38), and the sealing ball is located between the first and second biasing means. The diameter of the sealing ball is greater than the first diameter but smaller than the second diameter and is capable of sealing the second part of the bore. Under normal flow conditions of fluid through the bore, the first biasing means is configured to bias the sealing ball away from the second part of the bore. Under conditions of high pressure fluid flow through the bore, the sealing ball is forced towards a junction (21) between the second and third parts of the bore, against the first biasing means, sealing the outlet.

15 Claims, 5 Drawing Sheets

(51) Int. Cl.
*F16K 15/04* (2006.01)
*F16K 15/18* (2006.01)
*F16K 1/30* (2006.01)
*F16K 17/40* (2006.01)
*F17C 13/04* (2006.01)

(52) U.S. Cl.
CPC ............ *F16K 17/285* (2013.01); *F16K 1/307* (2013.01); *F16K 17/403* (2013.01); *F17C 13/04* (2013.01); *F17C 2205/0332* (2013.01); *Y10T 137/7869* (2015.04)

(58) Field of Classification Search
CPC .. F16K 1/307; F17C 13/04; F17C 2205/0332; Y10T 137/7869
See application file for complete search history.

(56) References Cited

U.S. PATENT DOCUMENTS

| | | | | |
|---|---|---|---|---|
| 2,323,352 A * | 7/1943 | Pitts | ............................ | F16F 9/48 74/501.5 H |
| 2,541,282 A * | 2/1951 | Powers | ...................... | F16T 1/12 137/204 |
| 3,489,172 A * | 1/1970 | Whitmore | ............ | A61B 5/0235 137/512.1 |
| 3,561,471 A * | 2/1971 | Sands | ...................... | F16K 17/26 137/498 |
| 3,640,320 A * | 2/1972 | Elkuch | ...................... | F17C 5/02 141/59 |
| 3,645,286 A * | 2/1972 | Follett | ...................... | F16K 17/28 137/68.14 |
| 3,732,890 A * | 5/1973 | Smith | ................... | F16K 31/363 137/512.3 |
| 4,030,520 A * | 6/1977 | Sands | ...................... | F16K 15/048 137/513.5 |
| 4,077,422 A * | 3/1978 | Brinkley | ................. | F16K 17/30 137/68.14 |
| 4,235,267 A * | 11/1980 | Brake | ................... | F16L 37/252 141/293 |
| 4,331,175 A * | 5/1982 | Brake | ................... | F17C 13/04 137/212 |
| 4,349,043 A * | 9/1982 | Christensen | ............ | E21B 34/10 137/505.42 |
| 4,380,911 A * | 4/1983 | Zumbiel | ............... | F25B 49/022 138/26 |
| 4,606,367 A * | 8/1986 | Britt | ......................... | F16K 1/14 137/15.12 |
| 4,635,680 A * | 1/1987 | Fang | ....................... | F16K 1/305 137/519.5 |
| 4,806,082 A * | 2/1989 | Schenk | ............... | F04B 53/1002 137/512.3 |
| 5,022,423 A * | 6/1991 | Britt | ....................... | F16K 17/40 137/329.3 |
| 5,103,860 A * | 4/1992 | Morris | .................... | F16K 17/34 137/460 |
| 5,197,710 A * | 3/1993 | Wass | ....................... | F17C 13/04 222/3 |
| 5,305,794 A * | 4/1994 | George | .................. | F16K 1/305 137/513.7 |
| 5,452,738 A * | 9/1995 | Borland | ............. | F02M 21/0242 137/265 |
| 5,820,102 A * | 10/1998 | Borland | ................. | F17C 13/04 251/144 |
| 5,829,465 A * | 11/1998 | Garretson | ............ | F17C 13/023 137/2 |
| 5,894,859 A * | 4/1999 | Pavlicek | ................. | F17C 13/04 137/460 |
| 5,941,268 A * | 8/1999 | Ross, Jr. | ............... | F17C 13/123 137/68.14 |
| 6,948,519 B2 * | 9/2005 | Cavagna | ................ | F16K 17/30 137/505.12 |
| 6,948,698 B1 * | 9/2005 | Scott | ...................... | F16K 1/306 137/68.19 |
| 7,182,099 B2 * | 2/2007 | Kremer | .................. | F16K 1/306 137/614.2 |
| 7,418,974 B2 * | 9/2008 | Kremer | .................... | F17C 1/00 137/614.2 |
| 8,156,961 B2 * | 4/2012 | Denis | ...................... | F16K 1/306 137/614.19 |
| 2003/0029508 A1 * | 2/2003 | Raboin | ................... | F17C 13/04 137/614.05 |
| 2005/0103382 A1 * | 5/2005 | Carter | .................... | F17C 13/04 137/487.5 |
| 2008/0196766 A1 * | 8/2008 | Gandy | .................. | F16K 17/403 137/68.14 |
| 2008/0308181 A1 * | 12/2008 | Denis | ..................... | F17C 13/04 141/360 |
| 2008/0314462 A1 * | 12/2008 | Nakamura | ............. | F17C 13/04 137/614.02 |
| 2009/0032121 A1 * | 2/2009 | Chon | .................... | F16K 15/026 137/529 |
| 2010/0308060 A1 * | 12/2010 | Lammers | ............... | F17C 13/04 220/582 |
| 2016/0040663 A1 * | 2/2016 | Herman | ................. | F16K 17/20 137/15.19 |
| 2016/0097486 A1 * | 4/2016 | Herman | ................. | F16K 15/044 184/6 |

* cited by examiner

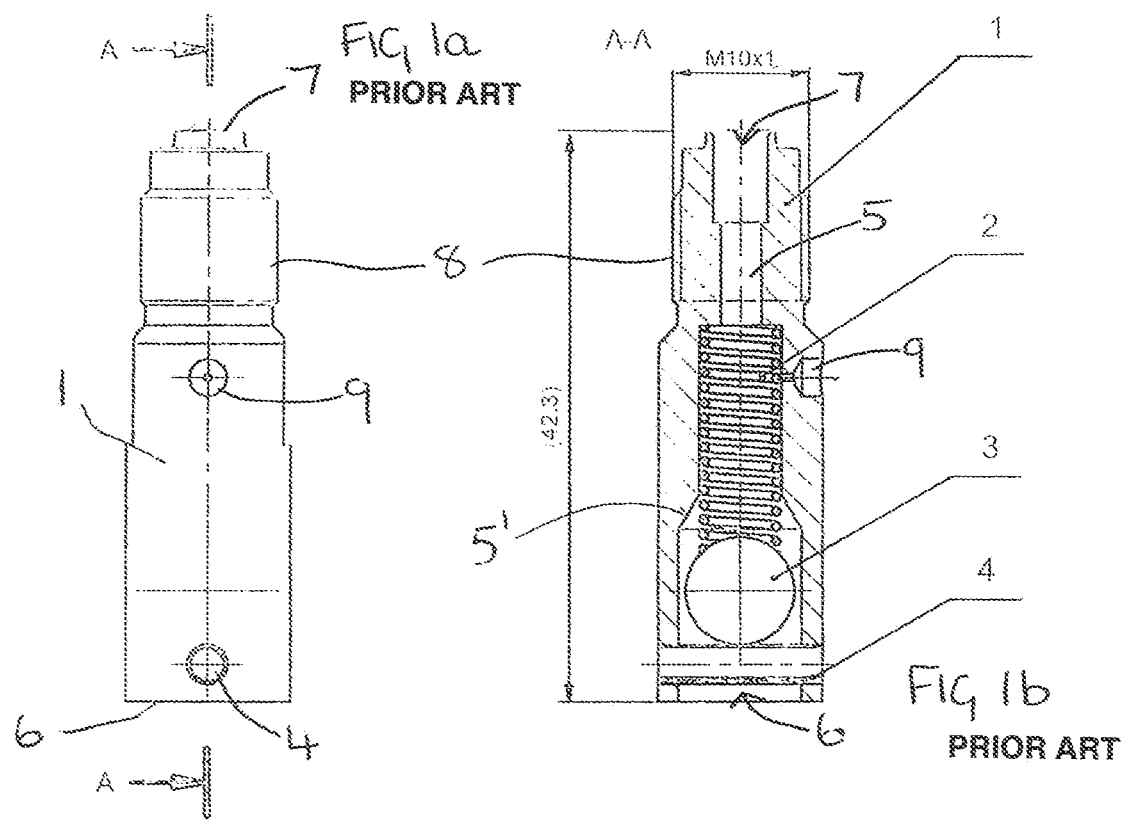
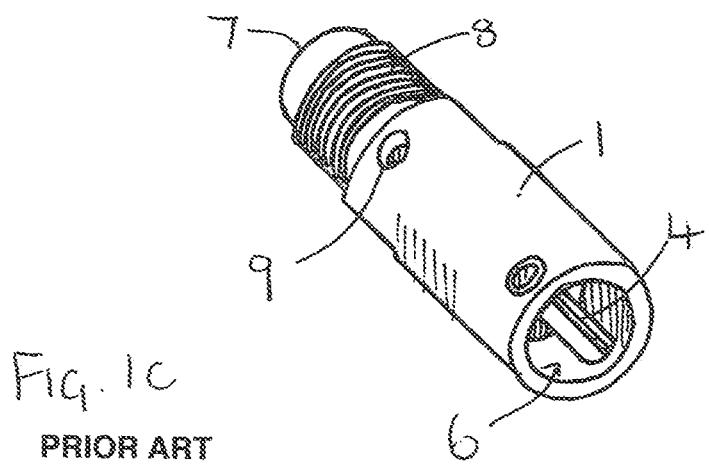

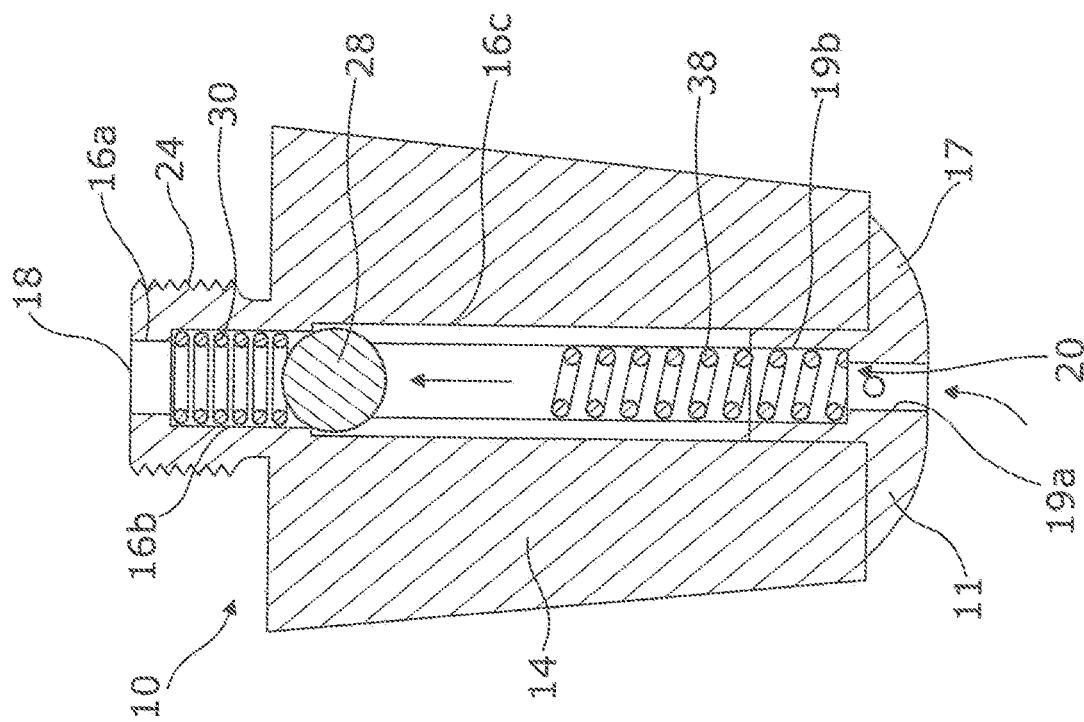
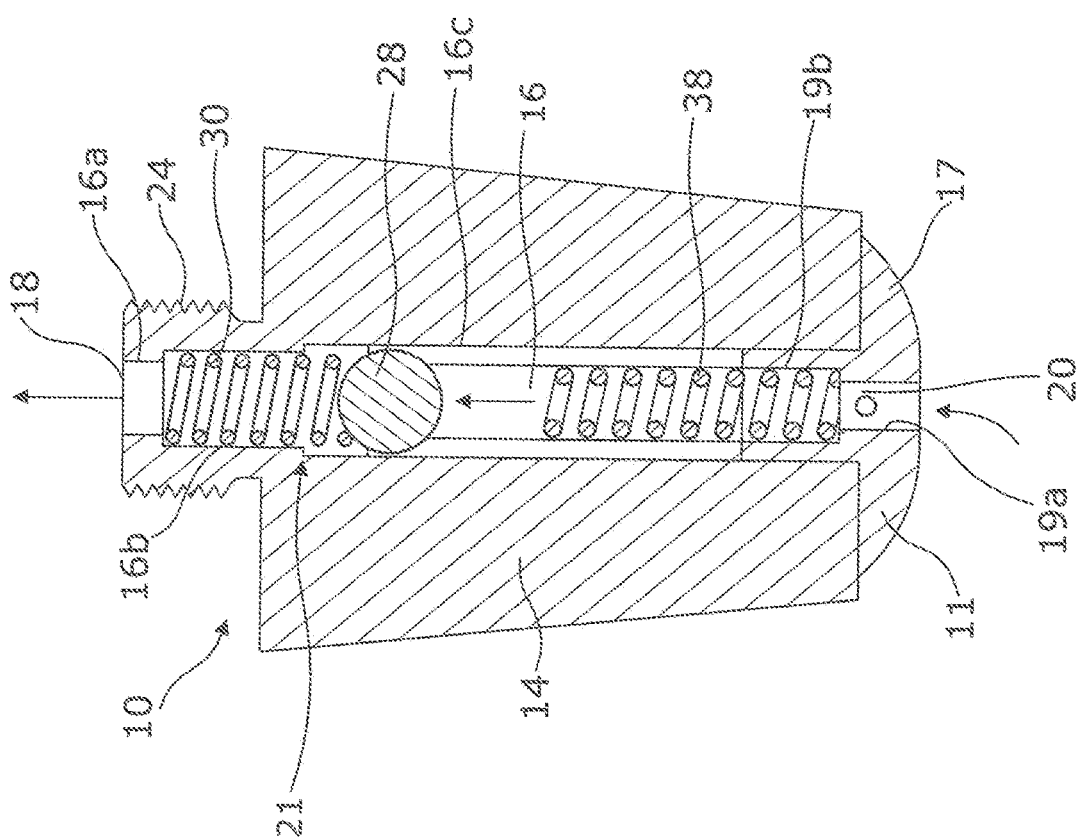
FIG. 3
FIG. 4

SAFETY VALVE

FIELD OF THE INVENTION

The invention relates to self-sealing safety valves for pressurised containers, particularly for containers used for the storage and dispensing of pressurised gases and liquids.

BACKGROUND OF THE INVENTION

Containers which are used to store and dispense pressurised gases and liquids incorporate a dispensing valve through which the contents are dispensed. If such a container is accidentally knocked over or dropped there is a risk of the dispensing valve being sheared off the container, causing the contents to escape at high pressure. As well as polluting the surrounding atmosphere with potentially hazardous chemicals, the rapid release of high pressure gas can cause the container to accelerate very rapidly, with the container essentially becoming a missile and potentially causing much damage and injury.

US 2008/0196766 describes a safety valve which may be retrofitted to existing valves. The device includes a breakaway section which includes a breakaway groove to set a predetermined breaking point and a sealing part which includes a plunger, a sealing ball and a spring. When the safety valve is intact the plunger pushes the ball away from the outlet, against the force of the spring, so that the cylinder contents can flow as normal. If the valve is sheared off at the predetermined breaking point then the plunger is removed with the valve and the ball is forced towards the outlet, sealing the contents in the cylinder. This safety valve relies on fracture of the valve at a certain point in order to seal the outlet and in doing so creates a weak point on the valve.

FIGS. 1a, 1b and 1c illustrate an excess flow valve assembly currently available on the market. The assembly is designed for use with small medical gas cylinders containing pressurised gases and is intended to reduce the flow from such cylinders in the event of a valve shearing accident occurring. As shown in the cross-sectional view of FIG. 1b, this device includes a substantially solid body 1, with a bore 5 therethrough, the bore 5 connecting an inlet 6 to an outlet 7. The outlet 7 is connectable to a dispensing valve (not shown) via a screw-threaded end portion 8 which mates with an internally screw-threaded portion on the dispensing valve. The combination of the dispensing valve and excess flow valve assembly is connected to a cylinder containing pressurised gas, such as oxygen or nitrous oxide. A sealing ball 3 is located within the bore 5 of the excess flow valve assembly and a spring 2 biases the sealing ball 3 away from the outlet 7. The portion of the bore 5 where the sealing ball 3 sits is wider than the portion of the bore which holds the spring 2 and the bore includes a chamfered portion 5' in between the two. A roll pin 4 keeps the sealing ball 3 within the bore 5. Under normal flow conditions through the bore 5 the spring 2 prevents the sealing ball 3 from blocking the outlet 7 and the fluid contents of the cylinder are dispensed as normal, passing through the inlet 6, through the bore 5, and out of the outlet 7. In the event of an accident where the dispensing valve has been damaged or sheared off, the contents of the cylinder may escape through the bore 5 under high pressure. Under these conditions the sealing ball 3 is forced towards the outlet 7 by the high-pressure fluid. The sealing ball 3 then sits within the chamfered portion 5' of the bore, compressing the spring 2 and blocking the flow of gas through the bore 5 from the inlet 6. In this situation, gas within the cylinder continues to flow through a slow release vent 9 located on the side of the body 1, upstream of the sealing ball 3, but the pressure of the released gas is reduced due to the size of the slow release vent 9. This excess flow assembly apparatus does not work to stop the flow of gas in the event of an accident where the dispensing valve has been damaged or sheared off and is not designed to work with larger gas cylinders.

It would be desirable to provide an improved safety valve.

SUMMARY OF THE INVENTION

One aspect of the invention provides a self-sealing safety valve for a container of pressurised fluid comprising a substantially solid body and attachment means for connecting to a dispensing valve, wherein the self-sealing safety valve includes a substantially central bore extending through both the attachment means and the solid body, the bore connecting an inlet to an outlet;

wherein the bore comprises three parts, each of a different diameter: a first part immediately adjacent the outlet has a first diameter; a second part located immediately adjacent the first part has a second diameter that is wider diameter than the first diameter; and a third part located immediately adjacent the second part has a third diameter that is wider than the second diameter;

wherein the second part of the bore houses a first biasing means and the third part of the bore houses a sealing ball and a second biasing means, the sealing ball being located between the first and second biasing means, and wherein the diameter of the sealing ball is greater than the first diameter but smaller than the second diameter and is capable of sealing said second part of the bore;

wherein under normal flow conditions of fluid through the bore, the first biasing means is configured to bias the sealing ball away from the second part of the bore, and under conditions of high pressure fluid flow through the bore, the sealing ball is forced towards a junction between the second and third parts of the bore, against the first biasing means, sealing the outlet.

The self-sealing safety valve may be retrofitted to standard container and is located in between the container and the dispensing valve such that fluid flows through the safety valve before flowing through the dispensing valve.

The dispensing valve comprises an inlet and an outlet and the safety-valve of the invention is connected to the inlet of the dispensing valve.

The container may be a cylinder. The pressurised fluid may be a gas.

The second biasing means helps to allow fluid flow through the bore and prevent any obstruction of the inlet by the sealing member.

The first and second biasing means may be springs, preferably a coil springs. The first biasing means allows fluid flow through the bore under normal flow conditions and is compressible by the sealing ball under high-pressure flow conditions.

The attachment means may comprise an externally threaded end portion shaped and dimensioned so as to be received by a complimentary internal threaded portion of the dispensing valve.

Preferably, the junction between the second and third parts of the bore is a right angle. Preferably the junction between the second and third parts of the bore provides a seat for the sealing ball and preferably the seat is a sharp edge.

Preferably, the substantially solid body includes walls which have a thickness and preferably the ratio of maximum bore diameter:wall thickness is in the range 1:1 to 1.2:1. The maximum bore diameter is the diameter of the third part of the bore.

Preferably, the safety valve further comprises an end cap and means for attachment of the end cap to the inlet. The means for attachment of the end cap to the inlet may comprise an externally threaded portion of the end cap shaped and dimensioned so as to be received by a complimentary internally threaded portion of the second part of the bore, immediately adjacent the inlet.

Preferably, the end cap bore comprises two parts: a first part with a first diameter for receiving the second biasing means; and a second part with a second diameter narrower than the first diameter of the first part of the end cap bore. Preferably, the second biasing means is contained within the second part of the bore by the end cap.

The second part of the end cap bore may include means for receiving a tool for fastening the end cap onto the main body. The tool may be an allen key.

Preferably the end cap comprises a domed external surface.

Preferably, the dispensing valve includes a joining portion with tapered walls and the substantially solid body of the safety valve comprises tapered external walls and the angle of the tapered walls of the safety valve corresponds to the angle of the tapered walls of the joining portion of the dispensing valve.

The self-sealing safety valve of the invention provides an improved safety valve which stops fluid flow under high-pressure flow conditions.

BRIEF DESCRIPTION OF THE DRAWINGS

In the drawings, which illustrate the prior art and preferred embodiments of the invention by way of example:

FIG. 1a illustrates a side view of a prior art excess flow valve assembly;

FIG. 1b illustrates a cross-sectional view of the prior art excess flow valve assembly of FIG. 1a taken along the axis A-A;

FIG. 1c illustrates a perspective view of the prior art excess flow valve assembly of FIG. 1a;

FIG. 3 illustrates a cross-sectional view of an example of a self-sealing safety valve according to the invention under normal operating conditions;

FIG. 4 illustrates a cross-sectional view of the safety valve of FIG. 2 under high-pressure conditions, for example due to failure of the dispensing valve;

DETAILED DESCRIPTION OF THE PREFERRED EMBODIMENTS

Figure 2:
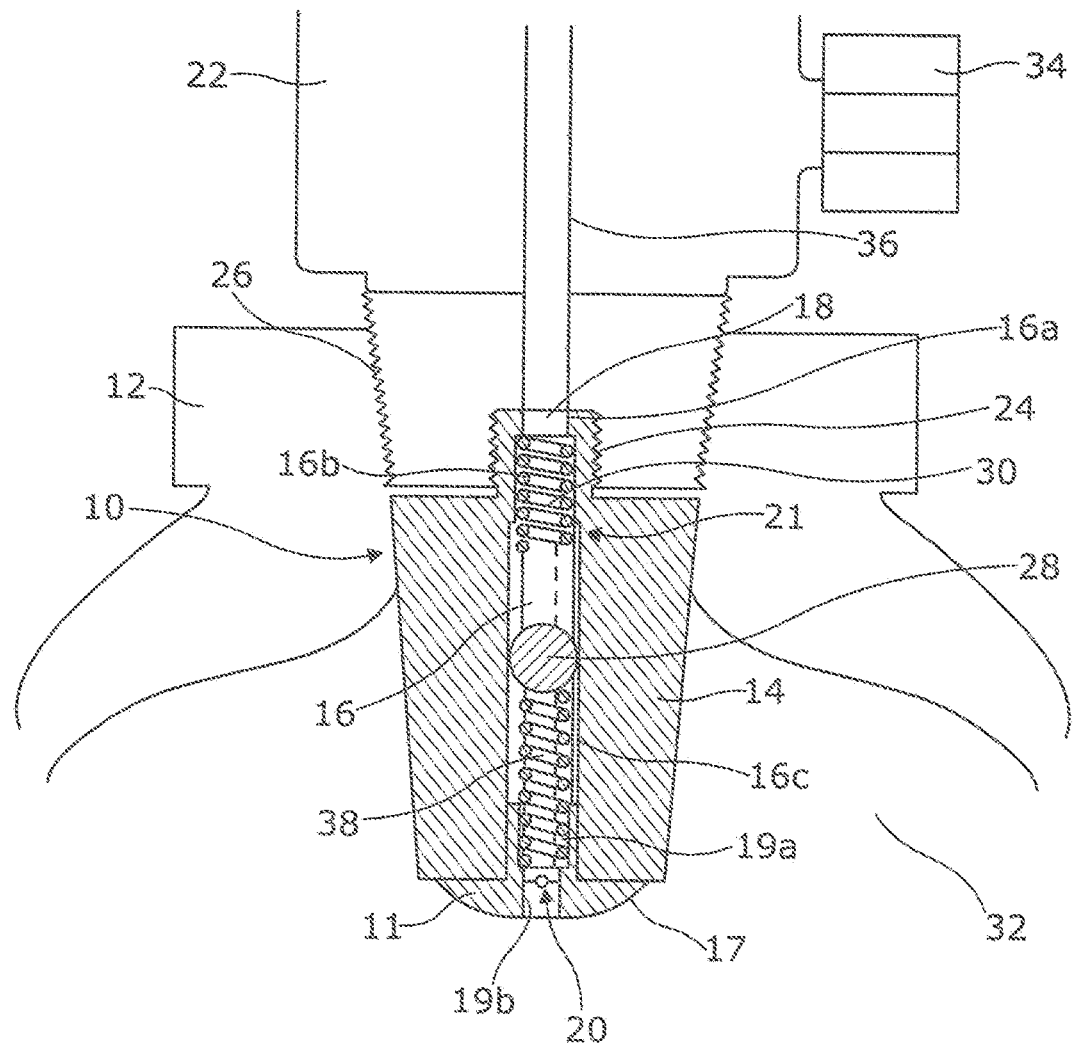
FIG. 2 illustrates a cross-sectional view through part of a container of pressurised fluid fitted with a dispensing valve and self-sealing safety valve according to the invention.
Figure 5:
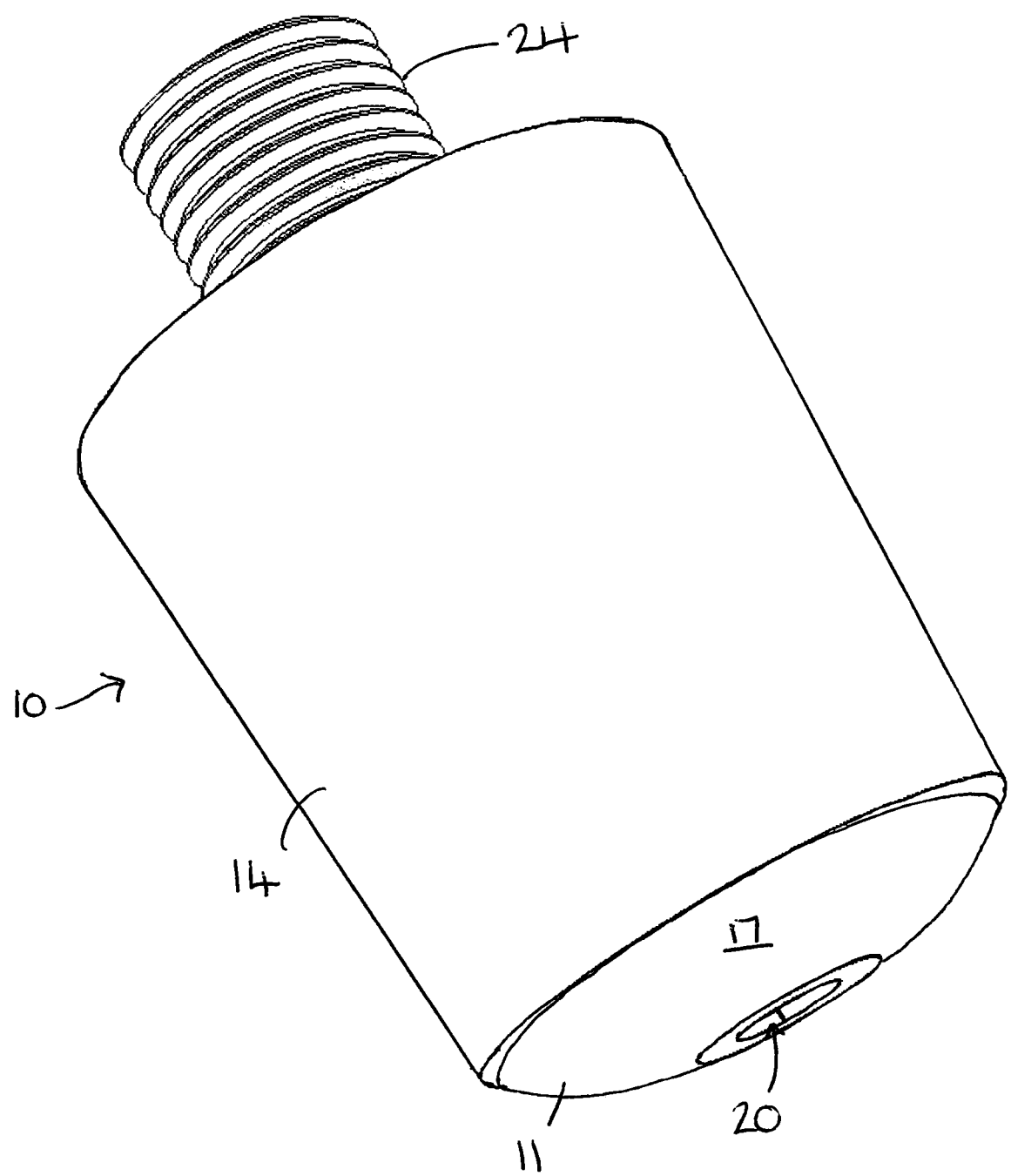
FIG. 5 illustrates a perspective view of the safety valve of FIG. 2.

FIG. 2 illustrates a cross-section through an example of a self-sealing safety valve 10 located in a container of pressurised fluid 12. The safety valve 10 comprises a substantially solid body 14 with a bore 16 therethrough, the bore 16 connecting an inlet 20 to an outlet 18. The outlet 18 is connected to a dispensing valve 22 via a screw-threaded attachment portion 24 which mates with an internally screw-threaded portion on the dispensing valve 22. The combination of the dispensing valve 22 and self-sealing safety valve 10 is connected to a container of pressurised fluid 12. The dispensing valve 22 includes a joining portion 26 which is externally threaded so as to be received by a complimentary internal threaded portion within the opening of the container 12. As shown in FIG. 2, the self-sealing safety valve 10 is located in between the container 12 and the dispensing valve 22, such that the fluid 32 must pass through the bore 16 of the safety valve 10 before passing through the dispensing valve 22. The outside walls of the safety valve 10 are preferably tapered such that the diameter of the valve adjacent the outlet 18 is wider than the diameter of the valve adjacent the inlet 20. Preferably, the tapered angle of the outside walls corresponds to the tapered angle of the opening of the container, as shown in the drawings. The tapered shape allows the safety valve 10 to fit into the neck of most standard cylinders. Preferably the outside wall is set at an angle of approximately 4 degrees to the longitudinal axis of the safety valve 10. In a preferred embodiment, the thickness of the outside walls varies between 7 mm at the top of the body 14 and 6 mm at the bottom.

The bore 16 passing through the self-sealing safety valve 10 comprises three parts each with varying diameter. The first part of the bore 16a, located adjacent to the outlet 18, has a first diameter. In a preferred example the first part of the bore 16a has a diameter of 4 mm. The second part of the bore 16b is located adjacent the first part 16a and has a wider diameter than the first part 16a. In a preferred example the second part of the bore 16b has a diameter of 5.5 mm. The third part of the bore 16c is located close to the inlet 20 and has a wider diameter than the second part of the bore 16b. In a preferred example the second part of the bore 16b has a diameter of 7 mm. The first part of the bore 16a is located within the attachment portion 24. The second part of the bore 16b preferably extends from the body 14 into the attachment portion 24. A sealing member in the form of a sealing ball 28 is located within the third part of the bore 16c. The sealing ball 28 has a diameter that is greater than the diameter of the second part of the bore 16b such that it is capable of sealing the second part of the bore 16b, and hence sealing the outlet 18 to fluid flow. Preferably the junction between the second part of the bore 16b and the third part of the bore 16c is a right-angled junction 21 as shown in the drawings. This right-angled junction provides a seat for the sealing ball. The diameter of the sealing ball 28 allows fluid to flow through the main bore 16, around the ball 28. In the preferred example the sealing ball 28 has a diameter of 6 mm and the third party of the bore 16c has a diameter of 7 mm. The self-sealing safety valve 10 also includes a first biasing means, in this example a spring 30, located in the second part of the bore 16b. The junction between the first and second parts of the bore, 16a, 16b, provides a seat for the spring 30. As shown in FIG. 3, under normal flow conditions through the bore 16 (controlled by the tap 34 of the dispensing valve 22), the spring 30 prevents the sealing ball 28 from blocking the second part of bore 16b and the fluid contents 32 of the container are dispensed as normal, passing through the inlet 20 of the safety valve 10, through the bore 16, out of the outlet 18 and into the passage 36 through the dispensing valve 22, as shown by the arrows in FIG. 3.

If the dispensing valve 22 has been damaged or sheared off then the contents 32 of the container 12 may escape through the bore 16 under high pressure. As shown in FIG. 4, under these conditions the sealing ball 28 is forced towards the junction between the second part of the bore 16b and the third part of the bore 16c, sealing the second part of the bore 16b and hence the outlet 18. As shown, the diameter of the sealing ball 28 is greater than the diameter of the second part of the bore 16b, so the sealing ball 28 is able to seal the outlet 18. The contents 32 of the container 12 are therefore kept contained and the container 12 is prevented from accelerating under the force of the escaping fluid.

The safety valve 10 also includes means for spacing the sealing ball 28 apart from the inlet 20. In this example, a second biasing means in the form of a spring 38 is also housed within the second part of the bore 16c, to maintain a distance between the inlet 20 and the sealing ball 28.

Figure 6:
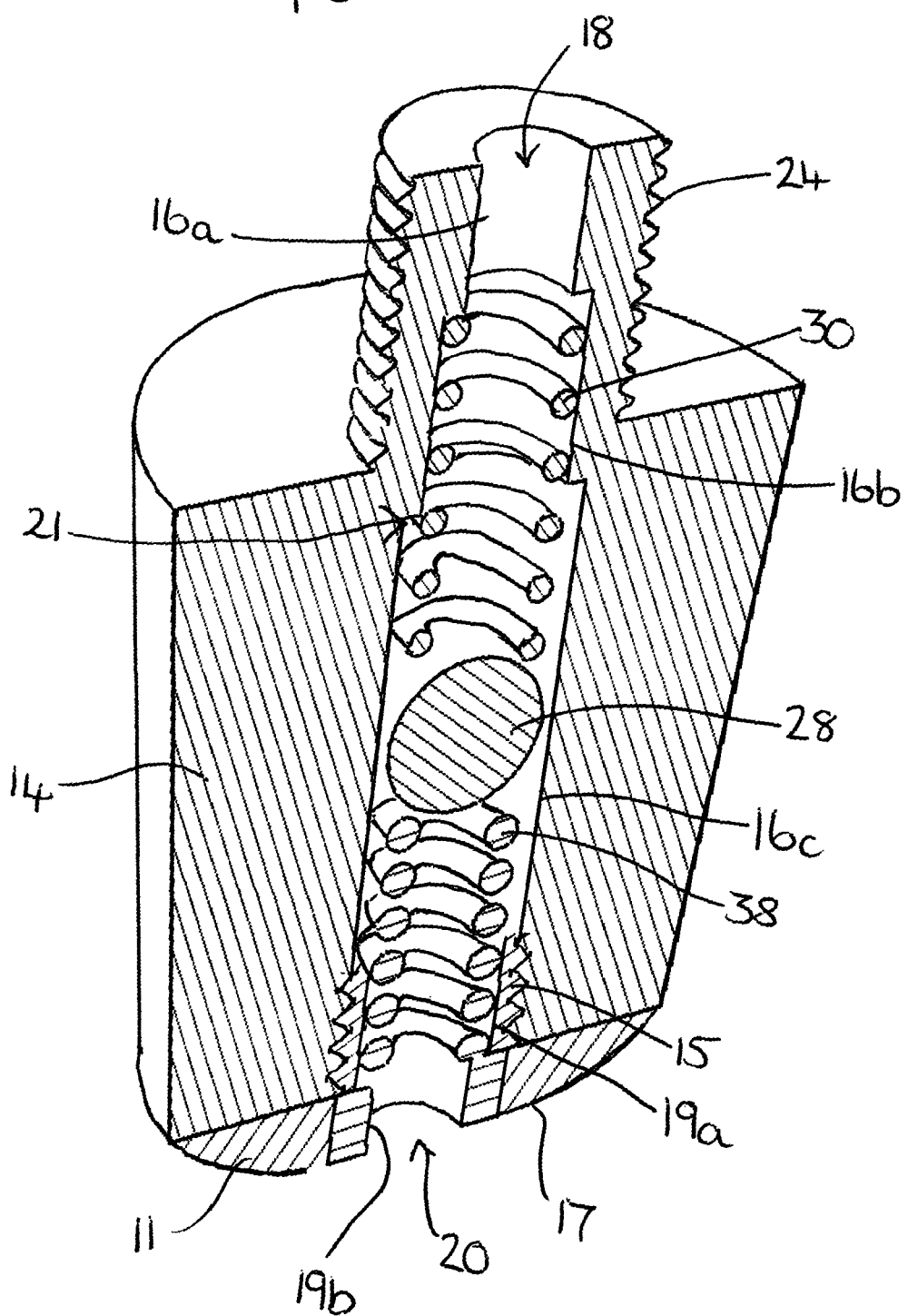
FIG. 6 illustrates a cross-sectional view of a further example of a self-sealing safety valve according to the invention under normal operating conditions.

As shown more clearly in FIG. 6, the safety valve 10 also preferably includes an end cap 11 which preferably attaches to the body 14 adjacent the inlet 20. The end cap 11 has a bore 19 therethrough which is aligned with the bore 16 through the main body 14 to allow fluid communication through the safety valve 10. The bore through the end cap preferably comprises two parts with differing diameters. A first part 19a, with a wider diameter, receives the spring 38, and a second, narrower part 19b provides a seat for the spring 38 and keeps it in place. In a preferred embodiment, the diameter of the first part of the end cap bore 19a is 5.5 mm, and the diameter of the second part of the end cap bore 19b is 4 mm. As shown in FIG. 6, the sealing ball 38 is preferably located between the two springs 30, 38 with little room for movement. This helps keeps the springs 30, 38 in position. The end cap also preferably has a domed external surface 17.

In the illustrated example the bore 16 through the body 14 includes an internally threaded portion immediately adjacent the inlet 20 and the end cap 11 includes a complimentary externally threaded portion 15. The second part of the end cap bore 19b may include means for receiving a tool, such as an allen key, to aid tightening of the end cap onto the body 14.

In the event of fluid 32 escaping the container 12 at high pressure, the self-sealing safety valve 10 of the invention ensures that the container 12 is sealed using the pressure of the fluid itself. The cause of the high-pressure fluid surge is irrelevant, for example the activation of the safety valve 10 is not limited to valve shearing accidents, but also incidents in which there might be a hose or fittings failure located upstream of the dispensing valve 22. Any high-pressure surge of fluid through the self-sealing safety valve 10 causes sealing of the container 12.

The invention claimed is:

1. A self-sealing safety valve for a container of pressurised fluid comprising a solid body and attachment means for connecting to a dispensing valve, wherein the self-sealing safety valve includes a central bore extending through both the attachment means and the solid body, the bore connecting an inlet to an outlet;

wherein the bore comprises three parts, each of a different diameter: a first part immediately adjacent the outlet has a first diameter; a second part located immediately adjacent the first part has a second diameter that is wider diameter dun the first diameter; and a third part located immediately adjacent the second part has a third diameter that is wider than the second diameter;

wherein the second part of the bore houses a first biasing means and the third part of the bore housing a sealing ball and a second biasing means, the sealing ball being located between the first and second biasing means, and wherein the diameter of the sealing ball is greater than the first diameter but smaller than the third diameter and is capable of sealing said second part of the bore;

wherein under normal flow conditions of fluid through the bore, the first biasing means is configured to bias the sealing ball away from the second part of the bore, and under conditions of high pressure fluid flow through the bore, the sealing ball is forced towards a junction between the second and third parts of the bore, against the first biasing means, sealing the outlet;

and wherein, in use, the self-sealing safety valve is located inside the container of pressurised fluid;

and wherein the solid body of the safety valve comprises a tapered external wall and the angle of the tapered wall of the safety valve cooperates with a taper angle of an opening in one end of the container which receives the dispensing valve.

2. A self-sealing safety valve according to claim 1, wherein each of the biasing means is a spring.

3. A self-sealing safety valve according to claim 1, wherein the biasing means is a coil spring.

4. A self-sealing safety valve according to claim 1 wherein the attachment means comprises an externally threaded end portion shaped and dimensioned so as to be received by a complimentary internal threaded portion of the dispensing valve.

5. A self-sealing safety valve according to claim 1 wherein the junction between the first and second parts of the bore is a right angle.

6. A self-sealing safety valve according to claim 1, wherein the solid body includes walls which have a thickness and a ratio of maximum bore diameter to the wall thickness is in the range 1:1 to 1.2:1.

7. A self-sealing safety valve according to claim 1, wherein the dispensing valve includes a tapered wall which is threaded externally and the angle of the tapered wall of the dispensing valve corresponds to the taper angle of the opening and the taper angle of the external wall of the safety valve, which opening is threaded internally for attachment of the dispensing valve thereto.

8. A self-sealing safety valve according to claim 1 wherein the pressurised fluid is a gas.

9. A self-sealing safety valve according to claim 1, and wherein the dispensing valve also comprises tapered external walls and the angle of the tapered walls of the dispensing valve corresponds to the taper angle of the safety valve and the opening the dispensing valve and the container opening comprising corresponding dreads which provide for the removable attachment of the dispensing valve to the container and wherein the external wall of the self-sealing safety valve sits against the tapered opening of the container and wherein the externally threaded end portion of the attachment means is located in the complementary internal threaded portion of the dispensing valve.

10. A self-sealing safety valve for a container of pressurised fluid comprising a solid body and attachment means for connecting to a dispensing valve, wherein the self-sealing safety valve includes a central bore extending through both the attachment means and the solid body, the bore connecting an inlet an outlet;

wherein the bore comprises three parts, each of a different diameter: a first part immediately adjacent the outlet has a first diameter; a second part located immediately adjacent the first part has a second diameter that is wider diameter than the first diameter; and a third part located immediately adjacent the second part has a third diameter that is wider than the second diameter;

wherein the second part of the bore houses a first biasing means and the third part of the bore houses a sealing ball and a second biasing means, the sealing ball being located between the first and second biasing means, and wherein the diameter of the sealing ball is greater than the first diameter but smaller than the third diameter and is capable of sealing said second part of the bore;

wherein under normal flow conditions of fluid through the bore, the first biasing means is configured to bias the sealing ball away from the second part of the bore, and under conditions of high pressure fluid flow through the bore, the sealing hail is forced towards a junction between the second and third parts of the bore, against the first biasing means, sealing the outlet;

and wherein, in use, the self-sealing safety valve is located inside the container of pressurised fluid;

the safety valve further comprising an end cap and means for attachment of the end cap to the inlet, wherein the end cap comprises a bore arranged to align with and the bore through the body of the safety valve, and wherein the end cap comprises a domed external surface.

11. A self-sealing safety valve according to claim 10, wherein the means for attachment of the end cap to the inlet comprises an externally threaded portion of the end cap shaped and dimensioned so as to be received by a complimentary internally threaded portion of the second part of the bore, immediately adjacent the inlet.

12. A self-sealing safety valve according to claim 10, wherein the end cap bore comprises two parts: a first part with a first diameter for receiving the second biasing means; and a second part with a second diameter narrower than the first diameter of the first part of the end cap bore.

13. A self-sealing safety valve according to claim 12, wherein the second biasing means is contained within the second part of the bore by the end cap.

14. A combination of a dispensing valve and a self-sealing safety valve for a container of pressurised fluid, the safety valve comprising a solid body and attachment means for connecting to a dispensing valve, wherein the self-sealing safety valve includes a central bore extending through both the attachment means and the solid body, the bore connecting an inlet to an outlet;

wherein the bore comprises three parts, each of a different diameter: a first part immediately adjacent the outlet has a first diameter; a second part located immediately adjacent the first part has a second diameter that is wider diameter than the first diameter; and a third part located immediately adjacent the second part has a third diameter that is wider than the second diameter;

wherein the second part of the bore houses a first biasing means and the third part of the bore houses a sealing ball and a second biasing means, the sealing ball being located between the first and second biasing means, and wherein the diameter of the sealing ball is greater than the first diameter but smaller than the third diameter and is capable of sealing said second part of the bore;

wherein under normal flow conditions of fluid through the bore, the first biasing means is configured to bias the sealing ball away from the second part of the bore, and under conditions of high pressure fluid flow through the bore, the sealing ball is forced towards a junction between the second and third parts of the bore, against the first biasing means, sealing the outlet;

and wherein, in use, the self-sealing safety valve is located inside the container of pressurised fluid and wherein the solid body of the safety valve comprises a tapered external wall and the cooperates with angle of the tapered wall of the safety valve cooperates with a taper angle of an opening in one end of the container which receives the dispensing valve.

15. A combination of a dispensing valve and a self-sealing safety valve according to claim 14, wherein the attachment means comprises an externally threaded end portion shaped and dimensioned so as to be received by a complimentary internal threaded portion of the dispensing valve.

* * * * *